United States Patent [19]
Ueno et al.

[11] Patent Number: 5,142,956
[45] Date of Patent: Sep. 1, 1992

[54] APPARATUS FOR SPACING AND REORIENTING CROISSANT DOUGH PIECES

[75] Inventors: Sadao Ueno; Yasunori Tashiro, both of Utsunomiya, Japan

[73] Assignee: Rheon Automatic Machinery Co., Ltd., Utsunomiya, Japan

[21] Appl. No.: 782,005

[22] Filed: Oct. 22, 1991

[30] Foreign Application Priority Data

Oct. 23, 1990 [JP] Japan .................. 2-285621

[51] Int. Cl.⁵ .................. B26D 7/00; B65G 47/00
[52] U.S. Cl. .................. 83/102; 83/155.1; 99/450.1; 198/379; 198/468.3; 414/783; 425/296; 425/308
[58] Field of Search .................. 99/450.1; 83/102, 112, 83/153, 155.1; 414/783, 757; 198/374, 379, 468.3; 425/296, 308, 310, 363

[56] References Cited

U.S. PATENT DOCUMENTS

| | | | |
|---|---|---|---|
| 3,503,527 | 3/1970 | Devol | 414/783 |
| 4,703,679 | 11/1987 | Hayashi et al. | 83/102 |
| 4,832,180 | 5/1989 | Ferrero | 198/468.3 |

FOREIGN PATENT DOCUMENTS

| | | |
|---|---|---|
| 902440 | 9/1985 | Belgium . |
| 382105 | 8/1990 | European Pat. Off. . |
| 284835 | 10/1988 | European Pat. Off. . |
| 2486771 | 1/1982 | France . |
| 2045195 | 10/1980 | United Kingdom . |
| 382105 | 8/1990 | European Pat. Off. . |
| 284835 | 10/1988 | European Pat. Off. . |
| 2486771 | 1/1982 | France . |
| 2045195 | | United Kingdom . |
| 902440 | 9/1985 | Belgium . |

*Primary Examiner*—George Yeung
*Attorney, Agent, or Firm*—Guy W. Shoup; Patrick T. Bever

[57] ABSTRACT

An apparatus for spacing and orienting croissant dough pieces has a dough-spacing device located at the position where the dough pieces are transferred from the upstream conveyor to the downstream conveyor, which dough-spacing device places the dough pieces apart from one another in the feeding direction on the downstream conveyor in a staggered manner, and a reorienting device for turning the dough pieces, with one side of each dough piece at right angles to the feeding direction of the downstream conveyor. The dough pieces are thus spaced apart from one another without increasing the conveyor width. The dough pieces are also fed to a downstream rolling-up apparatus after ensuring that the relevant side of each of the dough pieces is perpendicular to the feeding direction.

2 Claims, 5 Drawing Sheets

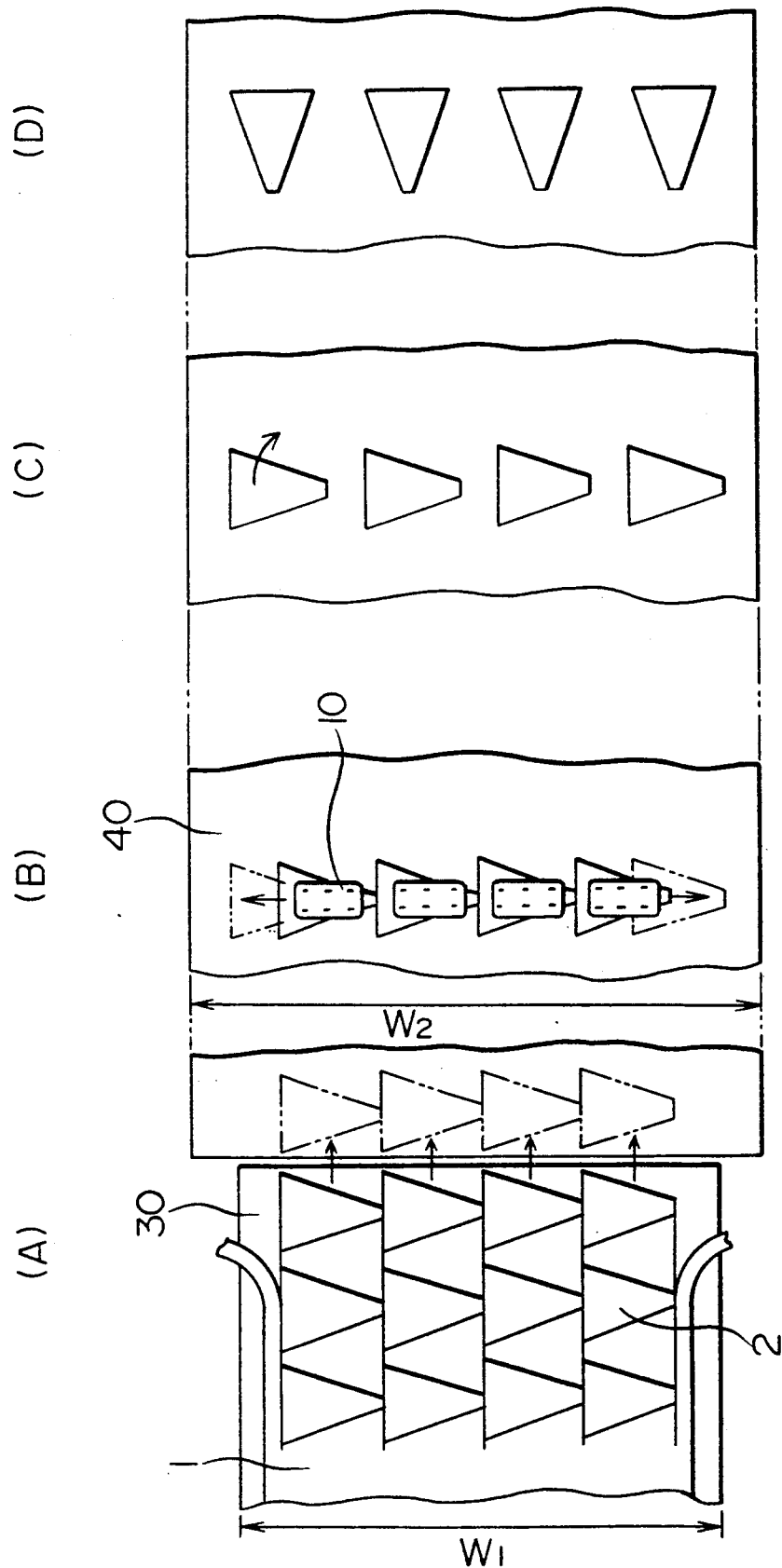

APPARATUS FOR SPACING AND REORIENTING CROISSANT DOUGH PIECES

BACKGROUND OF THE INVENTION

1. Field of the Invention

The invention relates to a dough-piece arraying apparatus for a machine that automatically forms croissants or the like.

2. Prior Art

In forming croissants a dough sheet is cut into dough pieces having polygonal shapes. The dough pieces are then rolled up from one of their sides. When this is done continuously in a rolling-up means of a croissant molder etc., the dough pieces are arrayed with their longest sides at right angles to the direction of transfer before being fed to the rolling-up means.

Japanese Patent No. 1,343,038, assigned to the applicant, discloses an arraying apparatus for crossiant dough pieces. As shown in FIG. 5A, a dough sheet 1 is cut into triangular pieces with their bases being in the feeding direction. They are then conveyed from an upstream conveyor 30 to a downstream conveyor 40 that is running at a speed faster than the upstream conveyor 30. After the dough pieces are transferred from the upstream conveyor 30 to the downstream conveyor 40, they are transversely spaced apart from one another by piece holders 10, which are to move the dough pieces in the transverse direction (see Section B of FIG. 5), and the same time they are turned 90 degrees (see Sections C and D of FIG. 5) so that the base of each piece forms the leading end, aligned at right angles with the feeding direction. In this apparatus the distance between the adjacent dough pieces increases in the transverse direction to avoid any interference between the corners of the adjacent pieces when they are turning. As a result, although the width of the upstream conveyor 30 is W1, the width of the downstream conveyor 40 must be widened to W2. Thus, to keep the space for the spacing and turning of the dough pieces, the downstream conveyor will have to be substantially broader than the upstream conveyor. This creates a disadvantage in that the apparatus becomes large.

SUMMARY OF THE INVENTION

In this invention, dough pieces are spaced apart from one another without increasing the conveyor width. The dough pieces are also fed to a downstream station after ensuring that the bases of the triangles of the dough pieces cross the advancing direction.

This invention provides method for spacing and orienting croissant dough pieces, comprising the steps of continuously conveying a dough sheet, cutting the dough sheet into polygonal pieces, each with one relevant side in the feeding direction, spacing them in the feeding direction apart from one another in a staggered manner, and turning the dough pieces to position the relevant side of each dough piece at right angles to the conveying direction.

The invention also provides an apparatus for spacing and orienting croissant dough pieces, comprising an upstream conveyor for feeding a continuous dough sheet, a cutting means for cutting the dough sheet into pieces having polygonal shapes, with one relevant side in the feeding direction, a downstream conveyor arranged in series with the upstream conveyor, the downstream conveyor arranged to move faster than the upstream conveyor, a dough-spacing means located at the position where the dough pieces are transferred from the upstream conveyor to the downstream conveyor, and arranged to space the dough pieces apart from one another in the feeding direction on the downstream conveyor in a staggered manner, and a reorienting means for turning the dough pieces to position the relevant side of each dough piece at right angles to the feeding direction of the downstream conveyor.

In preferred embodiment of this invention an alignment plate is positioned downstream of the reorienting means to align the relevant side of each dough piece.

It is therefore an object of this invention to provide a method and apparatus in which dough pieces are spaced apart from one another in the advancing direction.

BRIEF DESCRIPTION OF THE DRAWINGS

FIG. 5 is a schematic view showing the manner of spacing and reorienting dough pieces of a prior art apparatus.

DESCRIPTION OF THE PREFERRED EMBODIMENT

Figure 1:
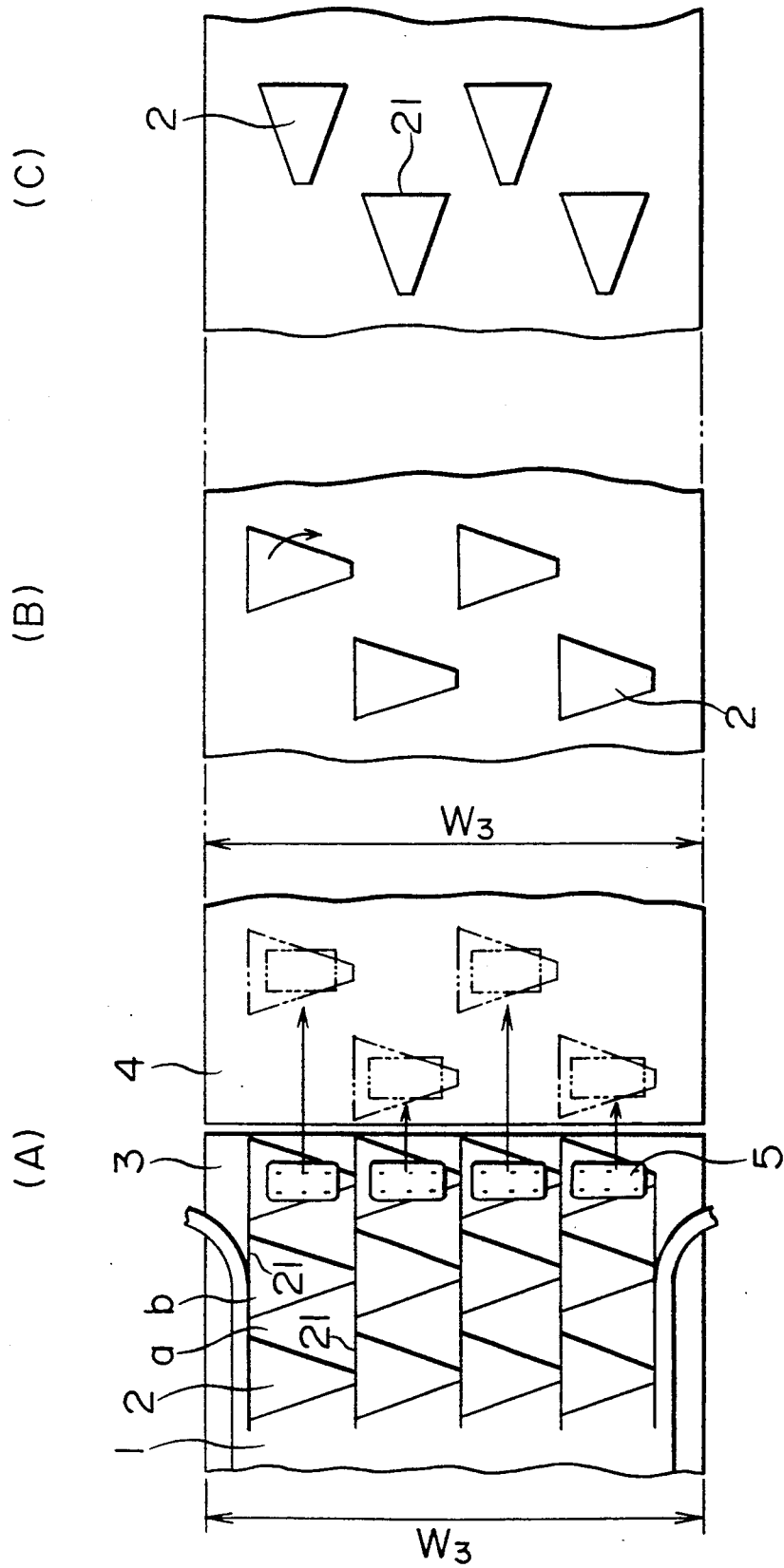
FIG. 1 is a schematic view showing the manner of spacing and reorienting the dough pieces of this invention.

In section A of FIG. 1, a dough sheet 1 is cut into pieces 2, each being substantially shaped into an isosceles triangle or a trapezoid by any known cutter means (not shown). The dough pieces 2 includes two groups forming alternate rows a and b. Each row has bases of isosceles triangles of dough pieces, which bases are aligned with the feeding direction of the conveyor 3. One row has bases facing one side of the apparatus, while the other row has bases facing the other side. The dough pieces 2 are conveyed by an upstream conveyor 3. A downstream conveyor 4 is abuts the upstream copnveyor 3. The conveying speed of the downstream conveyor 4 is faster than that of the upstream conveyor 3.

Figure 2:
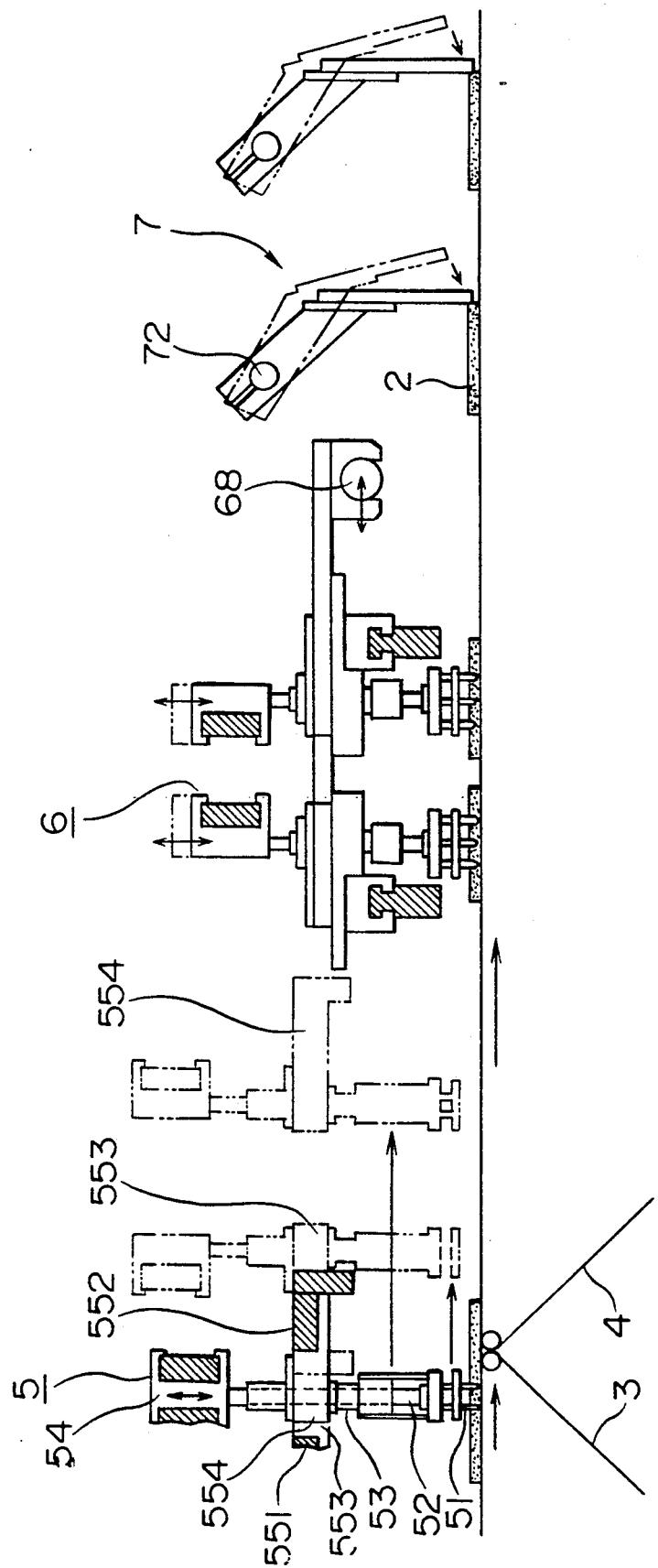
FIG. 2 is a schematic side view of an embodiment of the invention.

A spacing means 5 is located where the conveyors 3 and 4 abut (see FIG. 2). It includes a vertical shaft 52 that is slidably inserted in a pipe 53. The top end of the shaft 52 is fixedly connected to a holder member 54. The bottom end of the shaft 52 has claws 51 that are to be inserted in a dough piece 2 and that are to pull it forwardly to be spaced apart from the dough, sheet 1. The holder member 54 is arranged to make up-and-down reciprocating movements and causes the claws 51 to move up and down.

A spacing arm means 55 is located to move the spacing means along the conveyors 3 and 4. It comprises two arms 551 and 552, which are parallel to each other and which extend laterally over the width of the conveyors 3 and 4. The arms 551 and 552 are slidably supported on two rails 56, each rail extending longitudinally and being fixed on each side of the conveyors 3 and 4. Cam followers 571 and 572 are fixed to an end of each of the arms 551 and 552, respectively, and are also inserted in grooves 581 and 582, respectively. The grooves are provided on a cylindrical cam 58 fixed on a driven shaft 583. The grooves 581 and 582 are so shaped that the distance of the travel of the arm 552 in the advancing direction is greater than that of the arms 551 when the cam 58 rotates. Brackets 553 and 544 are connected to the arms 551 and 552 alternately on the leading side and the trailing side of each arm. Each bracket supports the pipe 53 of each spacing means 5 to have it correspond to each dough piece in the row a or b.

When the cam 58 rotates, the cam followers 571 and 572 are respectively led in the grooves 581 and 582, thereby causing the spacing means 5 to be carried with the arms 551 and 552 in the advancing direction. As a result, the spacing means 5 that are supported by the arm 552 are moved a greater distance than that of the spacing means 5 that are supported by the arm 551, thereby causing the spacing means 5 to be arranged in a staggered location, so that spaces for turning the dough pieces can be kept.

Figure 3:
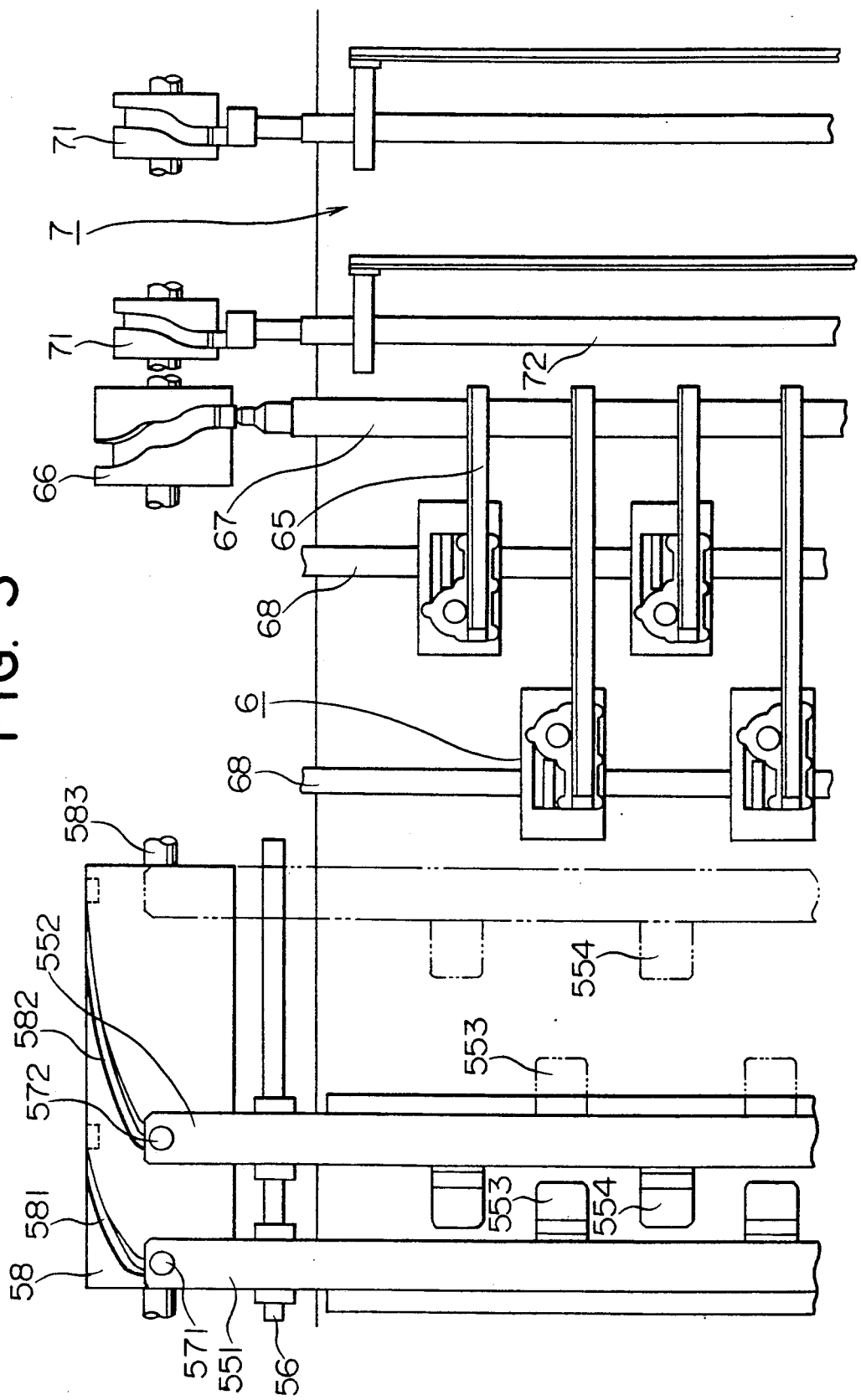
FIG. 3 is a schematic plan view of the embodiment in FIG. 2.
Figure 4:
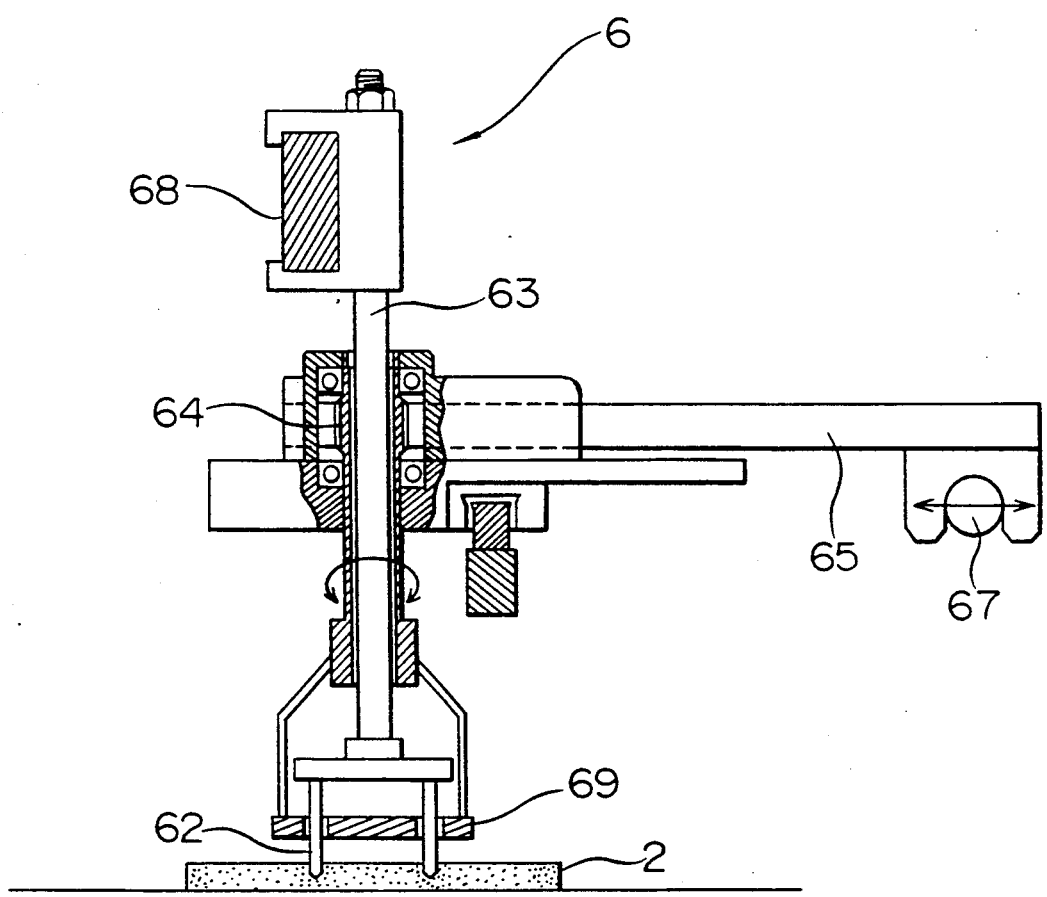
FIG. 4 is a side view, partially broken away, of the reorienting means of this invention.

FIGS. 3 and 4 show a plurality of reorienting means 6 that are to hold the dough pieces by claws 62 and to rotate them with their bases aligned in the advancing direction. Each reorienting means 6 includes a vertical shaft 63. A pinion gear 64 is provided on a shaft that is in alignment with the shaft 63 and that is slidably fitted on it. The top end of the shaft 63 is rotatably held by a holder member that is supported by a shaft holder 68. The bottom end of the shaft 63 is connected to the claws 62. A hold-down plate 69 is fixed to an end of the shaft that is provided with the pinion gear 64, and has through-holes. The claws 62 are passed through them. When the holder member supported by the shaft holder 68 makes the vertical reciprocating movement, the claws 62 are caused to move up and down. The pinion gear 64 meshes with the teeth of a rack member 65.

As shown in FIG. 3, two shaft holder 68 are located parallel to each other and extend laterally over the conveyor 4. The reorienting means 6 are alternately arranged in a staggered manner, and are alternately held by the shaft holders 68, so that each of the reorienting means 6 can correspond to each dough piece that has been arranged by each of the spring means 5 in a staggered location. The rack members 65 are mounted on a shaft 67 straddling the width of the conveyor 4 at right angles to the direction of movement of the conveyor. One end of the shaft 67 engages a groove of a driven cylindrical cam 66, the shaft of which extends parallel to the direction of the conveyor. The groove is made to horizontally and reciprocately move the shaft 67 with the rack members 65 when the cam makes one revolution. When the cam 66 rotates 180 degrees, the rack members 65 are led forward or backward. This movement of each rack member 65 causes the pinion gear 64 to turn 90 degrees clockwise or counterclockwise, thereby causing the claws 62 to turn 90 degrees clockwise or counterclockwise. The rotational direction of the claws 62 is selected according to the direction of the base of the dough piece when the dough piece is carried by the spacing means 5, so that the bases of the dough pieces are aligned so that they are directed to the advancing direction.

The sequence of the operation of the reorientation is as follows: 1) The claws 62 move downward, 2) they rotate the dough pieces depending on the direction of the dough row, 3) they move upward, and 4) they return. During the rotation of the dough pieces 2 they are made to slide on the conveyor.

FIG. 2 shows alignment plates 7 that are positioned downstream of the reorienting means 6 and extend at right angles to the direction of movement of the conveyor 4. Each plate 7 is fixed on a transverse shaft 72, which is rotatably supported by a frame (not shown). An end of each shaft 72 engages eccentrically with a groove of a cylindrical cam 71. The rotation of the cam 71 causes the shaft 72 to rotate, thereby causing the plate 7 to swing about the shaft 72 so that when the plate 7 is lowered it abuts the leading side of the moving dough pieces as indicated by arrows. Thereby, the dough pieces are momentarily stopped and arrayed with their bases at right angles to the direction of movement of the conveyor.

In the operation of the apparatus, as shown in Section A of FIG. 1 the dough pieces 2 that were cut from the dough sheet 1 are conveyed on the upstream conveyor 3. At the position where the upstream conveyor 3 abuts the downsteam conveyor 4, the spacing means 5 holds the corresponding rows of the dough pieces 2 with the claws 51 descending on them. The cam 58 simultaneously rotates and its rotation allows the arms 551 and 552 to move in the direction of the movement of the conveyors on the rails 56. The distance of the travel of the arm 552 is greater than that of the arms 551, so that dough pieces held by the arm 552 are ahead of the dough pieces held by the arms 551, as shown in Sections B of FIG. 1. Then, the claws 51 move up to release the dough pieces 2 on the downstream conveyor 4. As a result, as shown in Section C of FIG. 1, the dough pieces 2 are arrayed in staggered positions.

Thereafter, the dough pieces 2 move downstream to the station where the reorienting means 6 is positioned. The claws 62 move down to hold the dough pieces 2. When cams 66 are rotated, the claws 62 turn the dough pieces to direct their bases to the feeding direction of the conveyor.

When the dough pieces 2 are conveyed downstream to the alignment plates 7, the shaft 72 is rotated to swing the plates 7 so that their ends abuts the bases of the moving dough pieces. The dough pieces are so momentarily stopped, so that the direction of the bases are aligned. Then the shaft 72 is reversely rotated to release the dough pieces from the ends of the plates 7.

By this invention, to create each space for the dough piece to turn, dough pieces can be positioned in a staggered manner without being spaced apart in the transverse direction. If any irregular positioning of the bases of the dough pieces occurs after they pass the orienting means, due to such cases as when the dough pieces disengage from the claws prematurely and do not turn as described, or when dough pieces stick to the claws and they cannot be released from them, etc., the alignment plates can align the bases of the dough pieces, and correct any improper turning of the dough pieces. As a result, dough pieces are fed with the bases in the proper direeection to a croissant rolling-up apparatus at a downstream station.

As explained above, this invention does not need a large-width conveyor for reorienting. Thus it results in less space needed to install the apparatus. Also, production facilities are simplified, and at the same time, a faulty rolling-up in the formation of croissants in the succeeding process is minimized.

We claim:

1. An apparatus for spacing and orienting croissant dough pieces, comprising an upstream conveyor for feeding a continuous dough sheet, a cutting means for cutting the dough sheet into pieces having polygonal shapes, with one relevant side in the feeding direction, a downstream conveyor arranged in series with the upstream conveyor, the downstream conveyor arranged to move faster that the upstream conveyor, a dough-spacing means located at the position where the dough pieces are transferred from the upstream conveyor to the downstream conveyor and arranged to space the dough pieces apart from one another in the feeding direction on the downstream conveyor in a staggered manner, and a reorienting means for turning the dough pieces to position the relevant side of each dough piece at right angles to the feeding direction of the downstream conveyor.

2. The apparatus of claim 1, characterized in that an alignment plate is positioned downstream of the reorienting means to align the relevant side of each dough piece.

* * * * *